(12) United States Patent
Yu et al.

(10) Patent No.: US 11,106,368 B2
(45) Date of Patent: Aug. 31, 2021

(54) SOLID STATE DRIVE AND A METHOD FOR METADATA ACCESS

(71) Applicant: SAMSUNG ELECTRONICS CO., LTD., Suwon-si (KR)

(72) Inventors: Jae-Duk Yu, Seoul (KR); Jin-Young Kim, Seoul (KR); Yu-Hun Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 16/458,692

(22) Filed: Jul. 1, 2019

(65) Prior Publication Data
US 2020/0034047 A1 Jan. 30, 2020

(30) Foreign Application Priority Data
Jul. 24, 2018 (KR) .......................... 10-2018-0085788

(51) Int. Cl.
G06F 3/06 (2006.01)
G06F 13/16 (2006.01)

(52) U.S. Cl.
CPC ............ G06F 3/0614 (2013.01); G06F 3/064 (2013.01); G06F 3/0611 (2013.01); G06F 3/0653 (2013.01); G06F 3/0685 (2013.01); G06F 13/1668 (2013.01)

(58) Field of Classification Search
CPC .................................................... G06F 3/0614
USPC ........................................................ 711/104
See application file for complete search history.

(56) References Cited

U.S. PATENT DOCUMENTS

| 7,787,297 | B2 | 8/2010 | Jeon et al. | |
| 8,296,496 | B2 | 10/2012 | Mogul et al. | |
| 9,400,749 | B1 | 7/2016 | Kuzmin | |
| 9,805,052 | B2 | 10/2017 | Kadayam | |
| 2006/0095651 | A1* | 5/2006 | Tani | G06F 8/60 711/103 |
| 2010/0037001 | A1* | 2/2010 | Langlois | G06F 12/0246 711/103 |
| 2012/0271985 | A1 | 10/2012 | Jeong et al. | |
| 2013/0042054 | A1 | 2/2013 | Jung et al. | |
| 2013/0268825 | A1 | 10/2013 | Campardo et al. | |
| 2013/0329491 | A1 | 12/2013 | Chang et al. | |
| 2013/0332660 | A1 | 12/2013 | Talagala et al. | |

(Continued)

FOREIGN PATENT DOCUMENTS

CN 101622606 B 4/2014

OTHER PUBLICATIONS

Indian Office Action dated Feb. 17, 2021 Cited in Indian Application No. 201944018995.

Primary Examiner — Jae U Yu
(74) Attorney, Agent, or Firm — Volentine, Whitt & Francos, PLLC

(57) ABSTRACT

A solid state drive and a method for accessing the metadata are provided. The solid state drive includes different kinds of first and second memories and a memory controller which controls the first and second memories, wherein the memory controller receives a metadata access request from a host, and includes a condition checker which determines conditions of the first and second memories in response to the metadata access request and selects at least one of the conditions, and the memory controller accesses to the memory selected by the condition checker.

20 Claims, 12 Drawing Sheets

(56) References Cited

U.S. PATENT DOCUMENTS

| | | |
|---|---|---|
| 2014/0229655 A1 | 8/2014 | Goss et al. |
| 2017/0131902 A1 | 5/2017 | Goss et al. |
| 2018/0018259 A1 | 1/2018 | Chu et al. |
| 2018/0107595 A1* | 4/2018 | Jung ................... G06F 12/0866 |

* cited by examiner

| Status value | Condition point |
|---|---|
| t1 | a1 |
| t2 | a2 |
| t3 | a3 |
| t4 | a4 |

BLK

BLKb

SOLID STATE DRIVE AND A METHOD FOR METADATA ACCESS

CROSS-REFERENCE TO RELATED APPLICATION

This application claims priority under 35 U.S.C. 119 from Korean Patent Application No. 10-2018-0085788 filed on Jul. 24, 2018 in the Korean Intellectual Property Office, contents of which are herein incorporated by reference in their entirety.

BACKGROUND

1. Field of the Invention

The present invention relates to a solid state drive and a method for accessing the metadata for the solid state drive.

2. Description of the Related Art

A solid state drive (SSD) is a storage device that stores information in semiconductor memory, typically NAND flash memory. An SSD has advantages compared to a mechanical hard disk drive (HDD), including high speed, less mechanical delay, a lower failure rate, reduced heat generation, less noise, and may be made smaller and lighter than a hard disk drive. In particular, since there is no physical driving device in an SSD, there is no noise, and data processing speed is fast.

A new solid state drive has been developed for forming a composite solution by adding a memory of a kind different from the NAND flash memory to a conventional solid state drive having NAND flash memory. Such a composite solution device may have better operating performance according to the characteristics of different memories.

SUMMARY

Aspects of the present invention provide a solid state drive which may exhibit improved operating performance.

Aspects of the present invention provide a metadata access method of the solid state drive which may exhibit improved operational performance.

The aspects of the present invention are not restricted to those mentioned above and another aspect which is not mentioned may be clearly understood by those skilled in the art from the description below.

According to one aspect of the present inventive concept, there is provided a solid state drive. The solid state drive includes first and second memories of different types than each other, and a memory controller which controls the first and second memories, wherein the memory controller receives a metadata access request from a host, and includes a condition checker which determines conditions of the first and second memories in response to the metadata access request and selects at least one of the first and second memories based on at least one of the conditions, and the memory controller accesses the memory selected by the condition checker.

According to another exemplary embodiment of the present inventive concept, there is provided a solid state drive. The solid state drive includes a first memory which stores first metadata, a second memory which stores second metadata identical to the first metadata, and is of a different type than the first memory, and a memory controller which controls the first memory and the second memory, and includes a condition checker configured to determine conditions of the first memory and the second memory and to select a one of the first memory and the second memory which has a better condition, wherein the memory controller receives a metadata read request from the host, and reads one of the first metadata and second metadata stored in the memory selected by the condition checker among the first and second metadata in response to the metadata read request.

According to yet another aspect of the present inventive concept, there is provided a metadata access method of a solid state drive (SSD) which includes at least first and second memories of different types than each other. The method includes receiving a metadata read request from a host, determining conditions of the first and second memories to select one of the first and second memories, and reading metadata of a selected memory among the first and second memories.

According to still another aspect of the present inventive concept, there is provided a device, comprising: a first memory configured to store therein first metadata; a second memory configured to store therein second metadata, wherein the second memory is of a type which is different than the first memory; and a memory controller configured to control memory access operations for the first memory and the second memory. The memory controller includes a condition checker. The memory controller is configured to receive a metadata access request from outside the device and the condition checker is configured to determine a first condition of the first memory device and to determine a second condition of the second memory device in response to the metadata access request, and to select at least one of the first memory and the second memory based on the first condition and the second condition. The memory controller is configured to perform a metadata access operation for at least one of the first metadata and the second metadata based on which at least one of the first memory and the second memory is selected.

BRIEF DESCRIPTION OF THE DRAWINGS

The above and other aspects and features of the present invention will become more apparent by describing in detail exemplary embodiments thereof with reference to the attached drawings.

DETAILED DESCRIPTION OF THE EMBODIMENTS

Hereinafter, a semiconductor device according to some embodiments of the present invention will be described with reference to FIGS. 1 to 10.

Figure 1:
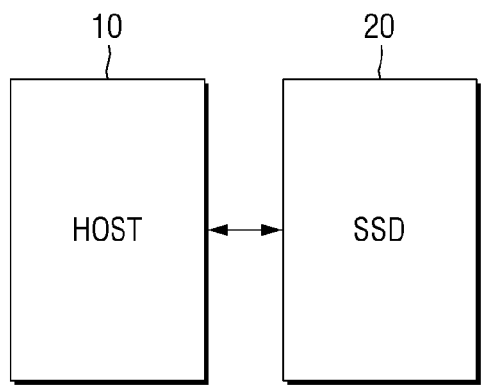
FIG. 1 is a block diagram illustrating an example embodiment of a solid state drive system.

FIG. 1 is a block diagram illustrating an example embodiment of a solid state drive system.

Referring to FIG. 1, a solid state drive system includes a host 10 and a solid state drive 20.

Host 10 may be coupled with solid state drive 20 from the outside of solid state drive 20. Host 10 may be connected to solid state drive 20 via a host interface. Host 10 may control the data processing operation (e.g., a program operation, an erase operation and a read operation) of solid state drive 20.

Host 10 may be implemented as a host processor, an integrated circuit (IC), a motherboard, a system on chip (SoC), an application processor (AP), a mobile AP, a web server, a data server, or a database server, but is not limited thereto.

Solid state drive 20 may transmit and receive commands and/or data to and from host 10 via the host interface. Solid state drive 20 may be implemented as a flash-based storage, but is not limited thereto. For example, solid state drive 20 may be implemented as a solid state drive (SSD) or an embedded SSD (eSSD), but is not limited thereto.

Host 10 and solid state drive 20 may be connected to each other to implement a single data processing system. The data processing system may be implemented as, for example, a PC (personal computer), a workstation, a data center, an internet data center (IDC), a DAS (direct attached storage) system, a SAN (storage area network) system, a NAS (network attached storage) system, a RAID (redundant array of inexpensive disks or redundant array of independent disks) system, or a mobile device, but is not limited thereto.

Also, the mobile device may be implemented as, for example, a laptop computer, a mobile phone, a smart phone, a tablet PC, a PDA (personal digital assistant), an EDA (enterprise digital assistant), a digital still camera, a digital video camera, a PMP (portable multimedia player), a PND (personal navigation device or portable navigation device), a handheld game console, a mobile internet device (MID), a wearable computer, an internet of things (IoT) device, an internet of everything (IoE) device, a drone or an e-book, but is not limited thereto.

Figure 2:
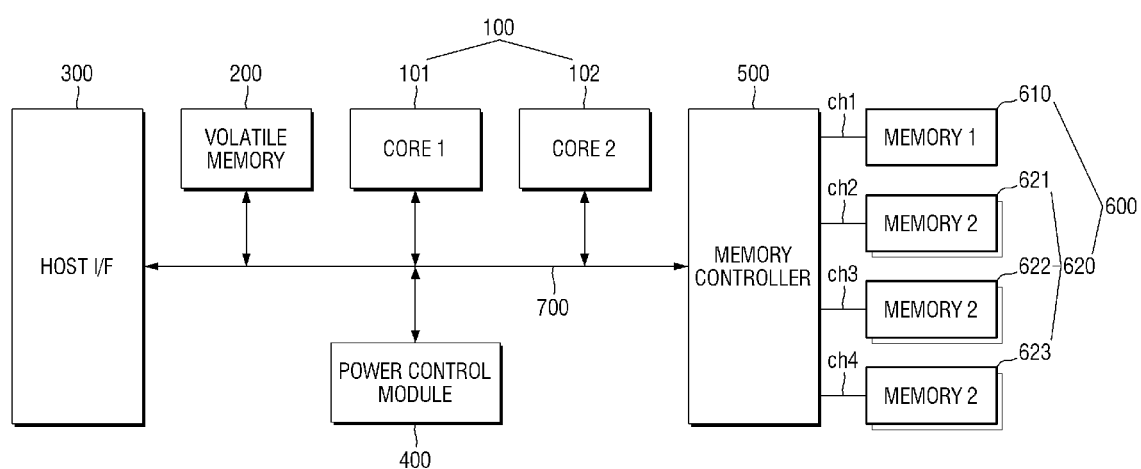
FIG. 2 is a block diagram illustrating an example embodiment of the solid state drive of FIG. 1.

FIG. 2 is a block diagram illustrating an example embodiment of the solid state drive of FIG. 1.

Referring to FIG. 2, the solid state drive includes a host interface 300, a processing core 100, a volatile memory 200, a power control module 400, a memory controller 500 and a non-volatile memory 600.

Host interface 300 may be a transmission path for commands and/or data between host 10 and solid state drive 20. According to various embodiments, host interface 300 may be implemented as a SATA (serial advanced technology attachment) interface, a SATAe (SATA express) interface, an SAS (serial attached small computer system interface (SCSI)) interface, a PCIe (peripheral component interconnect express) interface, an NVMe (non-volatile memory Express) interface, an AHCI (advanced host controller interface) interface, or a multimedia card (MMC) interface, but is not limited thereto.

According to various embodiments, host interface 300 may transmit electrical signals or optical signals.

Processing core 100 may perform operations of solid state drive 20. Specifically, it is possible to perform the operations of a data processing command transmitted by host 10 and the refresh operations of non-volatile memory 600 and the like.

Processing core 100 may include a first core 101 and a second core 102. First core 101 and second core 102 may be cores of the same kind or may be cores of different kinds from each other. First core 101 and second core 102 may separately perform various operations.

In FIG. 2, although processor core 100 is illustrated as two cores of first core 101 and second core 102, embodiments are not limited thereto. In some embodiments, the number of processing cores may be one or three or more.

Processor core 100 may perform the operations on the data processing commands and refresh operations of non-volatile memory 600 together with volatile memory 200. Volatile memory 200 may be, for example, a DRAM (Dynamic Random Access Memory). Volatile memory 200 may perform the role of buffer memory for performing the above operations.

Power control module 400 may control the power supplied to solid state drive 20. Power control module 400 may receive the supply of power from host (10 of FIG. 1) and control the power. Alternatively or additionally, power control module 400 may receive the supply of power from a battery located therein.

Memory controller 500 may control non-volatile memory 600. Upon receiving a request from the host (e.g., host 10 of FIG. 1), memory controller 500 may access non-volatile memory 600. Accordingly, memory controller 500 may control the transmission or processing of commands to non-volatile memory 600 and data to/from non-volatile memory 600.

Specifically, memory controller 500 may execute a program operation, a read operation, and an erase operation on non-volatile memory 600. Memory controller 500 will be described in more detail later.

Non-volatile memory 600 may internally program or store the data or read the data stored therein in accordance with a request from the host. Non-volatile memory 600 may include a first memory 610 and a second memory 620.

First memory 610 and second memory 620 may be different kinds or types of memory devices than each other. Here, the "type" of a memory device refers to the type of technology which is employed for storing data in the memory device For example, each of first memory 610 and second memory 620 may be one of a PRAM (Phase-change Random Access Memory), a RRAM (Resistive Random Access Memory), a MRAM (Magnetic Random Access Memory) and a NAND flash memory. For convenience, it is assumed below that first memory 610 is a PRAM and second memory 620 is a NAND flash memory.

In FIG. 2, first memory 610 may be connected to a first channel Ch1, and a plurality of second memories 620 may be connected to a second channel Ch2, a third channel Ch3, and a fourth channel Ch4. That is, second memory 620 may include a first channel memory 621 connected to the second channel Ch2, a second channel memory 622 connected to the third channel Ch3, and a third channel memory 623 connected to the fourth channel Ch4.

At this time, the configuration of FIG. 2 is merely an example, and the memory may be arranged in any other form. That is, a plurality of first memories 610 may be connected to a plurality of channels, and a single second memory 620 may be connected to one channel. Also, the total number of memories is not limited.

As described above, second memory 620 may include a three-dimensional NAND flash memory array. Second memory 620 may be monolithically formed on one or more physical levels of arrays of memory cells having an active region disposed above a silicon substrate and a circuit associated with the operation of the memory cells. The circuit associated with the operation of the memory cells may be located inside or above the substrate. The term "monolithically" means that layers of each level of the three-dimensional array are deposited directly on the layers of the lower level of the three-dimensional array.

In an exemplary embodiment, the three-dimensional memory array has a vertical directionality, and includes vertical NAND strings in which at least one memory cell is located above the other memory cell. At least one memory cell includes a charge trap layer. Each vertical NAND string may include at least one selection transistor located above the memory cells. At least one selection transistor has the same structure as the memory cell and may be monolithically formed together with the memory cell. This will be described in more detail later.

A system bus 700 may connect host interface 300, volatile memory 200, processing core 100, memory controller 500 connected to non-volatile memory 600, and power control module 400. That is, the movement of data and requests may be made via system bus 700.

Figures 3, 4:
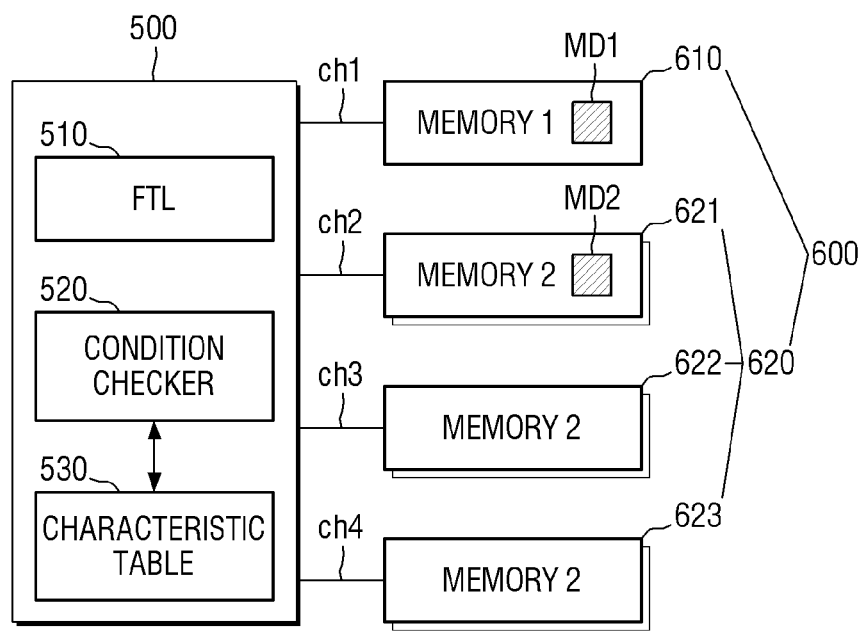
FIG. 3 is a block diagram illustrating an embodiment of the memory controller and memories of FIG. 2 in detail.
FIG. 4 is an exemplary view of a characteristic table illustrating the operation of a condition checker of FIG. 3 in detail.

FIG. 3 is a block diagram illustrating an embodiment of the memory controller and the memory of FIG. 2 in detail, and FIG. 4 is an example of a characteristic table illustrating an operation of a condition checker of FIG. 3 in detail.

Referring to FIG. 3, memory controller 500 may include a flash translation layer 510, a condition checker 520, and a characteristic table 530.

In response to a data access request from a host (e.g., host 10 of FIG. 1), flash translation layer 510 may convert the logical address received from the host into a physical address and provide the physical address to non-volatile memory 600.

Further, flash translation layer 510 may execute management operations of various cell regions (for example, a chip unit, a block unit, a page unit, etc.) of non-volatile memory 600. For example, garbage collection and bad block management operations of multiple blocks of non-volatile memory 600 may be performed.

Further, flash translation layer 510 may perform wear leveling. Wear leveling refers to dispersion of memory operations among the cells of the NAND flash memory. The cells of the NAND flash memory may be in an unstable state (wearing off) if they too frequently go through the program and erase processing. Therefore, memory operations among the cells of the NAND flash memory are dispersed so that each block simultaneously or nearly simultaneously reaches the limit of a program/erase (P/E) cycle.

Condition checker 520 may check the condition of each memory. That is, first memory 610 may have an associated first condition, which may change with time, and second memory 620 may have an associated second condition which may change with time, and the first condition and the second condition may be different than each other at any given point in time. Condition checker 520 may determine what the current conditions of first memory 610 and second memory 620 are.

First memory 610 and second memory 620 may each contain the same metadata. That is, first memory 610 may store a first metadata MD1 and second memory 620 may store a second metadata MD2, where the first metadata MD1 and the second metadata MD2 may be mirror data having the same contents.

The metadata may be important data for the initial driving of solid state drive 20. That is, the metadata may include data for secure authentication, data for initial driving of firmware, and data for firmware debugging.

Solid state drive 20 according to some embodiments may prepare for corruption of metadata by mirroring such metadata and storing it in different kinds or types of memories.

When there is an access request of metadata, that is, a read request for the metadata, from host 10, memory controller 500 receives the access request of metadata, and condition checker 520 may determine which memory of first memory 610 and second memory 620 has a better condition.

Condition checker 520 may determine the current condition of first memory 610 and may determine the current condition of second memory 620. Condition checker 520 may compare the condition of first memory 610 with the condition of second memory 620 to select a memory having a better condition.

The memory condition comparison method of condition checker 520 may be various. For example, condition checker 520 may refer to characteristic table 530. Although characteristic table 530 is illustrated in FIG. 3 to be located outside condition checker 520, embodiments are not limited thereto. That is, characteristic table 530 may be located inside condition checker 520 or may be stored in another memory outside memory controller 500 altogether. That is, the position of characteristic table 530 may not be restricted other than that it be accessible by condition checker 520.

Characteristic table 530 may include a characteristic table of first memory 610 and a characteristic table of second memory 620. Characteristic table 530 may include a condition score corresponding to a status value.

The status value may be a value of the current memory status. The status value may be, for example, at least one of a temperature, a P/E cycle, a program retention time and an erase retention time. However, embodiments are not limited thereto, and the condition score of another status value may be stored in characteristic table 530.

In the case of temperature, the condition of a NAND flash memory may be better than that of a PRAM at high temperature. If first memory 610 is a PRAM and second memory 620 is a NAND flash memory, condition checker 520 may give a high score to second memory 620 at a high temperature.

For example, the status value of first memory 610 may be t2 among t1 to t4, and the condition score thereof may be a2. In contrast, the status value of second memory 620 may be t3, and the condition score thereof may be b3 among b1 to b4. At this time, b1 to b4 may be values different from a1 to a4. This may be attributed to the difference in characteristics between the PRAM and the NAND flash memory.

In the case of the P/E cycle, since the reliability of the NAND flash memory is degraded as the number P/E cycles increases, the score reflecting this degradation may be stored in characteristic table 530. The program retention time means the time left unattended after being most recently programmed, and the erase retention time may mean the time left unattended after being most recently erased. When the program retention time and the erase retention time increase, the NAND flash memory threshold voltage distribution may widen by the action of electrons/holes in the cells of the NAND flash memory. That is, as the program retention time or the erase retention time increases, the reliability of second memory 620 which is a NAND flash memory may decrease.

Characteristic table 530 may store a condition score corresponding to each of the above status values reflecting the above-described characteristics. Condition checker 520 may receive current status information from first memory 610 and second memory 620, respectively. At this time, the current status information may include the status value.

A plurality of status values may be applied. For example, when considering all of the temperature and the P/E cycle, by adding the condition score according to temperature and the condition score according to the P/E cycle, it is possible to compare the condition scores of first memory 610 and second memory 620.

Condition checker 520 may select a memory having a higher condition score among first memory 610 and second memory 620. That is, condition checker 520 may select a memory having a better condition among the different kinds or types of memory.

Memory controller 500 may read the metadata of the memory selected by condition checker 520 in response to the metadata read request of a host (e.g., host 10 of FIG. 1). That is, when condition checker 520 selects first memory 610, memory controller 500 reads the first metadata MD1 of first memory 610, and in contrast, when condition checker 520 selects second memory 620, memory controller 500 may read the second metadata MD2 of second memory 620.

In this embodiment, since it is possible to access metadata in a better condition through the process described above, it may be possible to greatly improve the operating performance and reliability of solid state drive 20.

Figure 5:
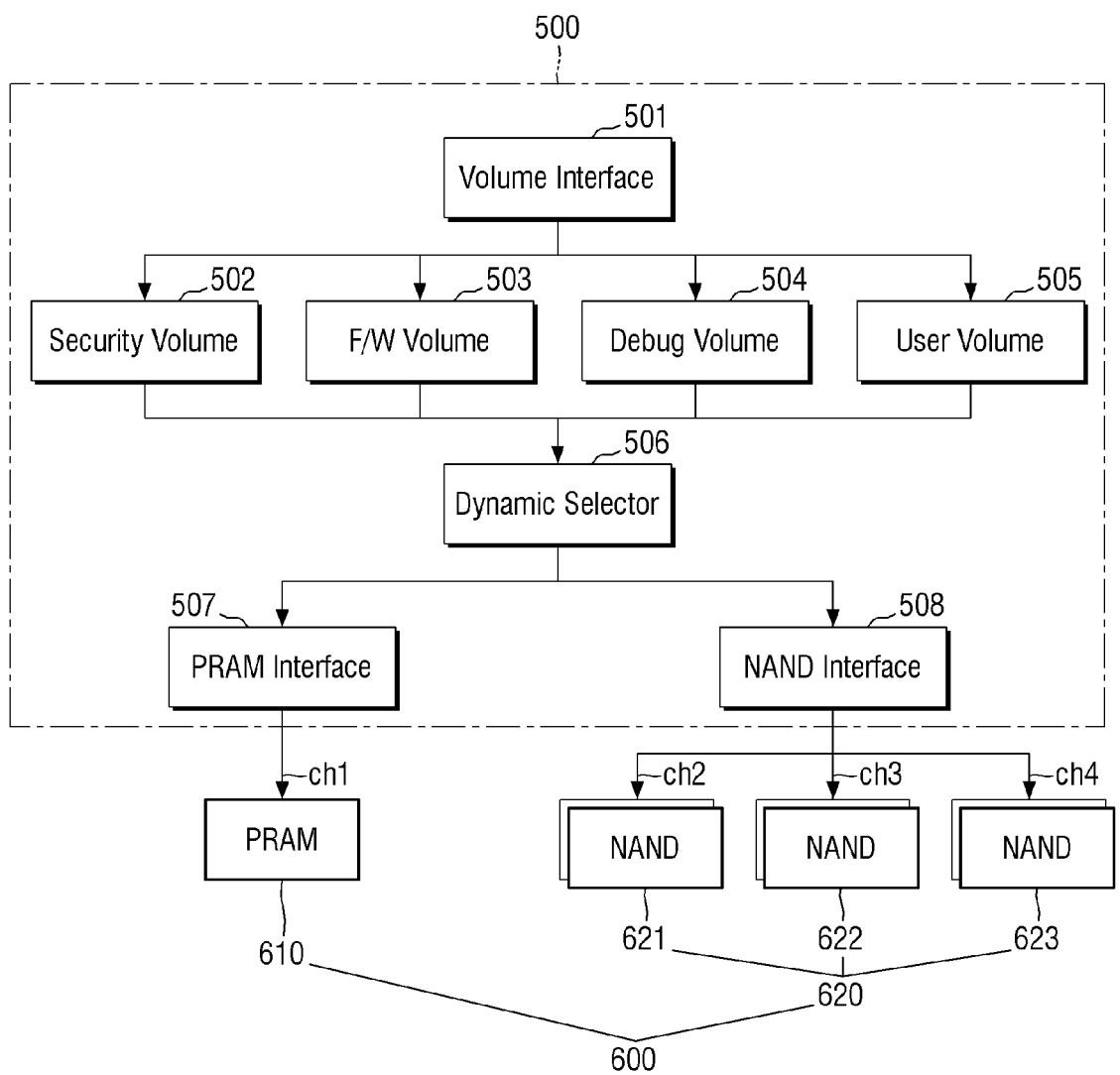
FIG. 5 is a block diagram illustrating an example embodiment of the memory controller of FIG. 3 from the viewpoint of interfaces.

FIG. 5 is a block diagram illustrating an embodiment of the memory controller of FIG. 3 from the viewpoint of interfaces.

Referring to FIG. 5, memory controller 500 may include a volume interface 501. Volume interface 501 may include a security volume 502, a firmware (F/W) volume 503, a debugging volume 504 and a user volume 505.

Security volume 502 may be a region for security authentication of solid state drive 20. Firmware volume 503 may be a region for firmware driver of solid state drive 20. Debug volume 504 may be a region for debugging of solid state drive 20. User volume 505 may be a region for the user to directly access to use.

These regions ultimately need to be accessed to one of first memory 610 and second memory 620, and one of first memory 610 and second memory 620 may be selected and accessed by dynamic selector 506. Dynamic selector 506 may permit the selective access in accordance with the operation of condition checker 520 of FIG. 3.

Since first memory 610 is a PRAM and second memory 620 is a NAND flash memory, PRAM interface 507 for accessing to first memory 610, and NAND interface 508 for accessing to second memory 620 may exist.

PRAM interface 507 may allow access to first memory 610, and NAND interface 508 may allow access to second memory 620.

Hereinafter, the structure of the NAND flash memory constituting second memory 620 of solid state drive 20 according to some embodiments will be described in detail with reference to FIGS. 6 to 8.

Figure 6:
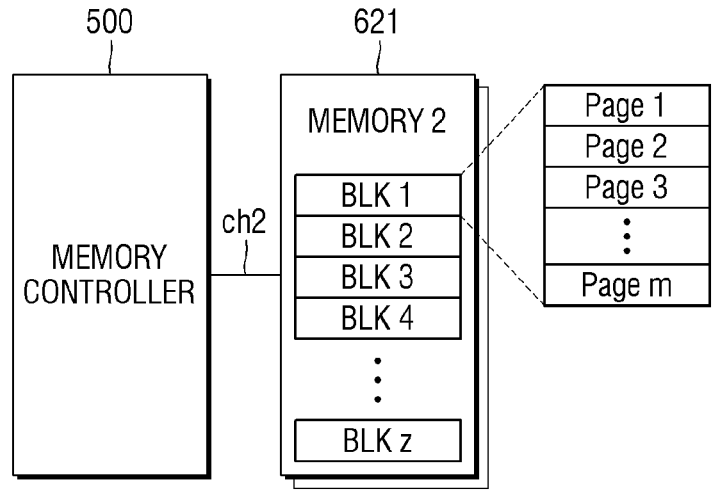
FIG. 6 is a block diagram illustrating a structure of a second memory of FIG. 3 in detail.
Figure 7:
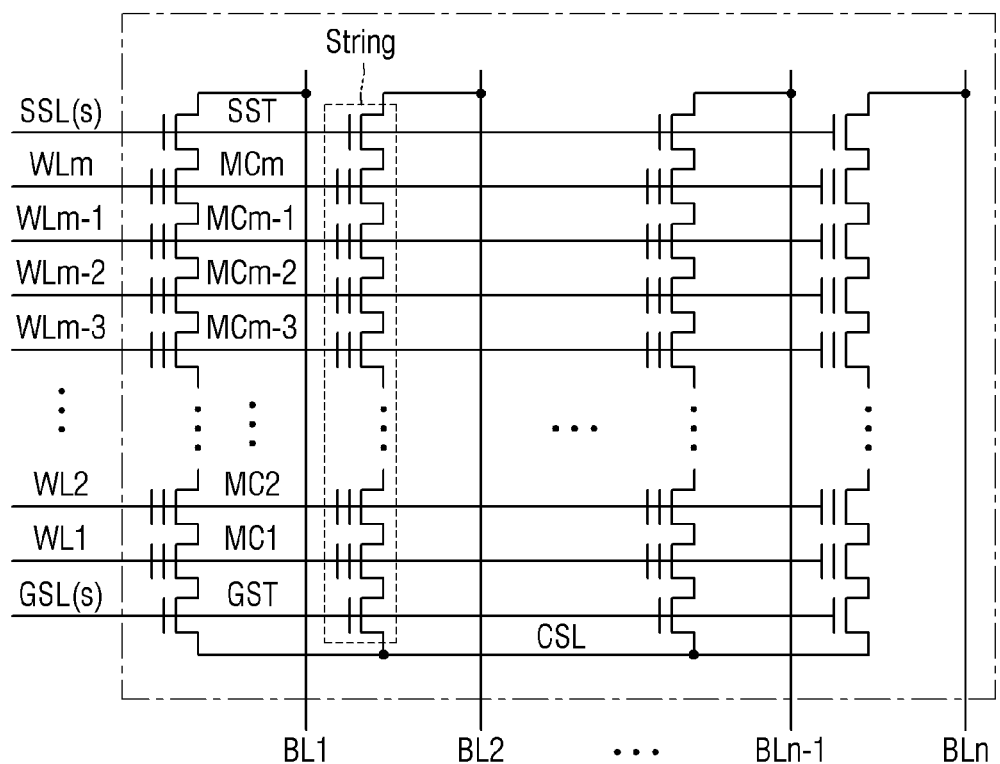
FIG. 7 is an exemplary equivalent circuit diagram of a memory block of the second memory of FIG. 6.

FIG. 6 is a block diagram illustrating the structure of the second memory of FIG. 3 in detail, and FIG. 7 is an exemplary equivalent circuit diagram of a memory block of the second memory of FIG. 6. FIG. 8 is an exemplary perspective view of the memory block of the second memory of FIG. 6.

For convenience, FIG. 6 illustrates only first channel memory 621 of second memory 620. Second channel memory 622 and third channel memory 623 may also have the same or similar structure as first channel memory 621.

Referring to FIG. 6, the first channel memory 621 includes a plurality of memory blocks (BLK1 to BLKz, z is an integer of 2 or more). Each of the plurality of memory blocks (BLK1 to BLKz) includes a plurality of pages (Page 1 to Page m, m is an integer of 2 or more).

Referring to FIG. 7, the memory block BLK includes strings connected to a plurality of bit lines (BL1 to BLn, n is an integer of 2 or more). Here, each of the strings includes at least one string selection transistor SST connected in series between a bit line and a common source line CSL, a plurality of memory cells (MC1 to MCm, m is an integer of 2 or more), and at least one ground selection transistor GST.

Each of the memory cells (MC1 to MCm) may store data of at least one bit or more. Although not illustrated, each of the strings may include at least one dummy cell between the selection transistor SST and the memory cells (MC1 to MCm), and at least one dummy cell between the memory cells (MC1 to MCm) and the ground selection the transistor GST.

Figure 8:
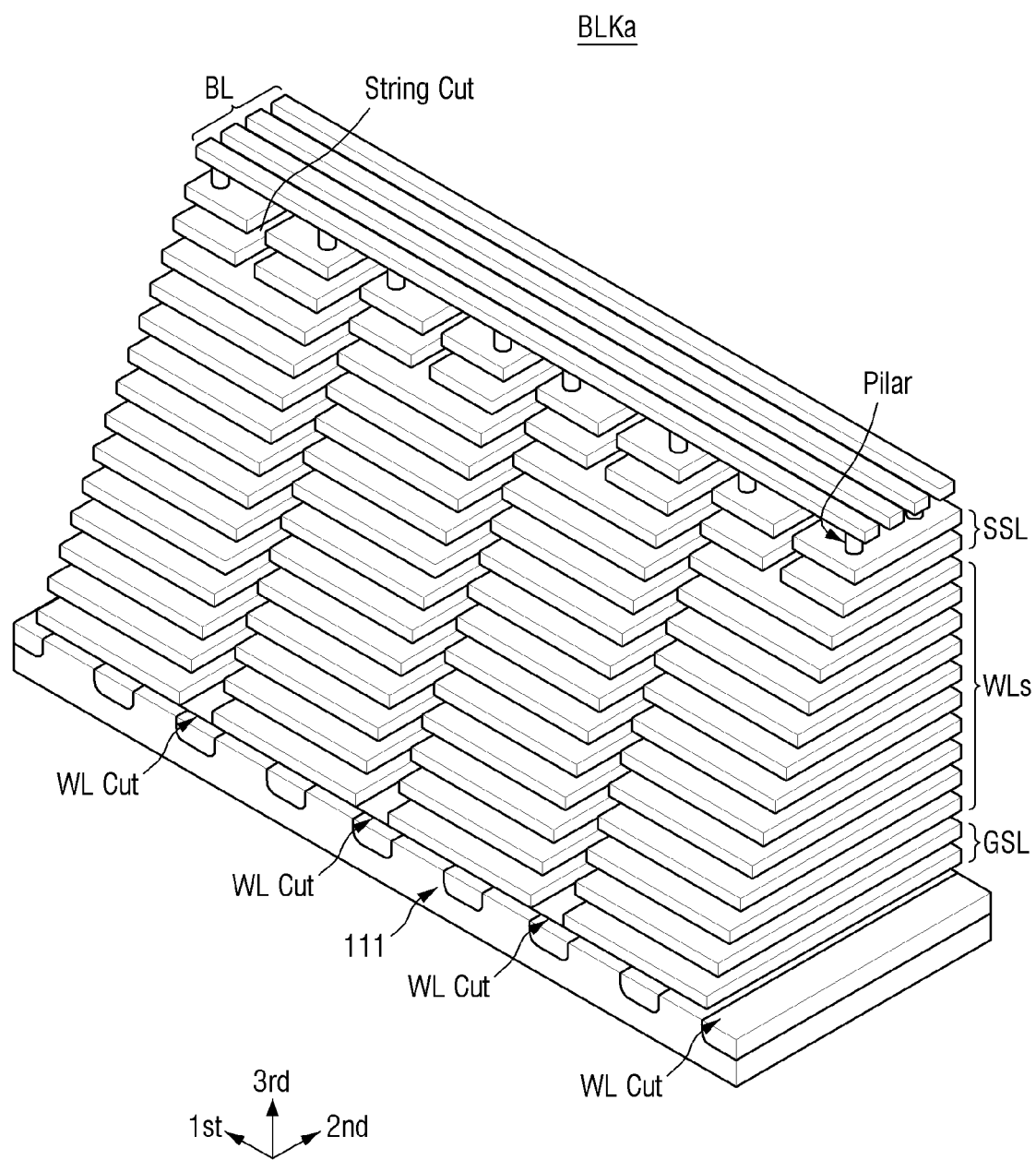
FIG. 8 is an exemplary perspective view of the memory block of the second memory of FIG. 6.

Referring to FIG. 8, four sub-blocks are formed on the substrate. Each sub-block is formed by stacking at least one ground selection line GSL, a plurality of word lines WLs and at least one string selection line SSL between the word line cuts (WL cut) on the substrate in the form of a plate. Here, at least one string selection line SSL is separated by a string selection line cut (String Cut). There is a string selection line cut in the memory block of FIG. 8, but embodiments are not limited thereto. That is, the memory block BLKa may be implemented so that a string selection line cut does not exist.

A first direction (1st) and a second direction (2nd) may intersect each other, and a third direction (3rd) may intersect the first direction (1st) and the second direction (2nd). For example, the first direction (1st), the second direction (2nd), and the third direction (3rd) may be orthogonal directions with respect to each other.

The ground selection line GSL, the word lines WLs, and the string selection line SSL extend in the second direction, and may be spaced apart from each other in the first direction by the word line cut and the string selection line cut. In addition, the ground selection line GSL, the word lines WLs, and the string selection line SSL may be sequentially stacked in the third direction.

In some embodiments, at least one dummy word line may be stacked in the form of a plate between the ground selection line GSL and the word lines WLs, or at least one dummy word line may be stacked in the form of a plate between the word lines WLs and the string selection line SSL.

Although not illustrated, each word line cut includes a common source line CSL. In the embodiment, the common source lines CSL included in each word line cut are commonly connected. A pillar connected to a bit line penetrates at least one ground selection line GSL, the plurality of word lines WLs and at least one string selection line SSL to form a string.

In FIG. 8, a target between the word line cuts is illustrated as a sub-block, but embodiments are not necessarily limited thereto. In the embodiment of FIG. 8, the target between the word line cut and the string selection line cut may be referred to as a sub-block.

The block BLKa may be implemented as a structure in which two word lines are merged to one, in other words, a merged wordline structure.

Figure 9:
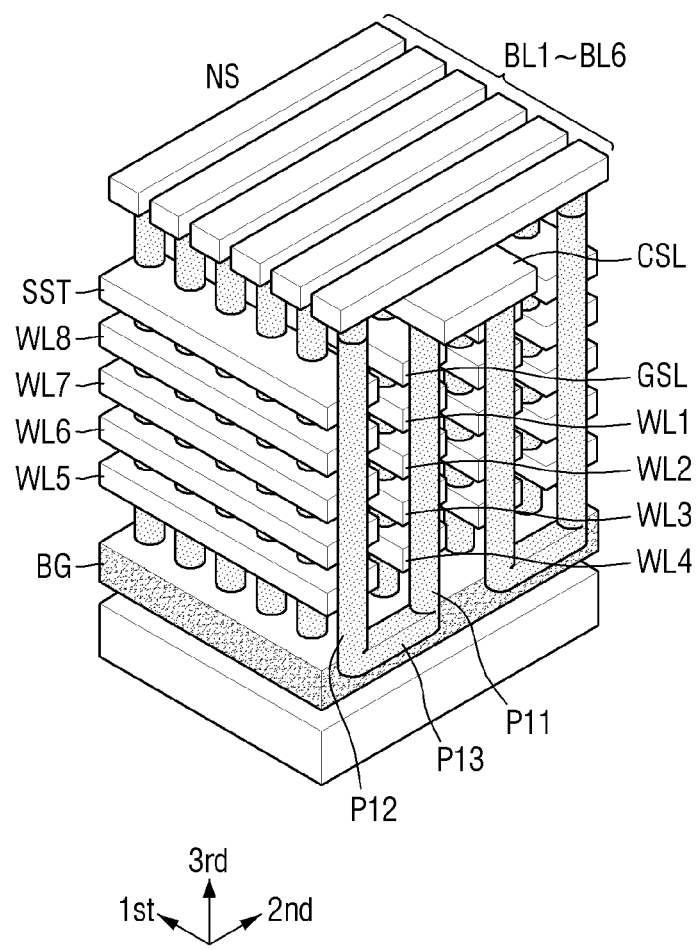
FIG. 9 is an exemplary perspective view of the memory block of the second memory of an example embodiment of a solid state drive.

FIG. 9 is an exemplary perspective view of the memory block of the second memory of an example embodiment of a solid state drive.

The structure of the block BLKb of FIG. 9 may be different from the block BLKa structure of FIG. 8.

Referring to FIG. 9, for convenience of explanation, the number of floors of the word line is defined as four in the memory block BLKb, but embodiments are not limited thereto. The memory block BLKb may be implemented as a pipe-shaped bit cost scalable (PBiCS) structure in which the lower ends of adjacent memory cells are connected in series by a pipe.

The memory block BLKb includes m×n (m and n are natural numbers) strings (NS). In FIG. 5, an example where m=6 and n=2 is illustrated, having 12 strings Ns. Each string NS includes serially connected memory cells (MC1 to MC8). Here, first upper ends of the memory cells (MC1 to MC8) are connected to the string selection transistor SST, and second upper ends of the memory cells (MC1 to MC8) are connected to the ground selection transistor (GST), and the lower ends of the memory cells (MC1 to MC8) are connected by pipes.

The word lines (WL1 to WL8) extend in the first direction (1st), and the strings NS may extend in the second direction (2nd). The word lines (WL1 to WL8) and the strings NS may be spaced apart from each other in the third direction (3rd).

Memory cells constituting the string NS are formed by being stacked on a plurality of semiconductor layers. Each string NS includes a first pillar PL11, a second pillar PL12, and a pillar connecting portion PL13 for connecting the first pillar PL11 and the second pillar PL12 to each other. The first pillar PL11 is connected to the bit line (for example, BL1) and the pillar connecting portion PL13, and is formed by penetrating between the string selection line SSL and the word lines (WL5 to WL8). The second pillar PL12 is connected to the common source line CSL and the pillar connecting portion PL13, and is formed by penetrating between the ground selection line GSL and the word lines (WL1 to WL4). As illustrated in FIG. 5, the string NS is implemented in the form of a U-shaped pillar.

At this time, the first pillar PL11 and the second pillar PL12 extend in the third direction, and the pillar connecting portion PL13 may be connected in the second direction.

In some embodiments of the invention, a back-gate BG is formed on the substrate, and the pillar connecting portion PL13 may be implemented inside the back-gate B G. In the embodiment, the back-gate BG may commonly exist in the block BLKb. The back-gate BG may have a structure separated from the back-gate of the other block.

Figure 10:
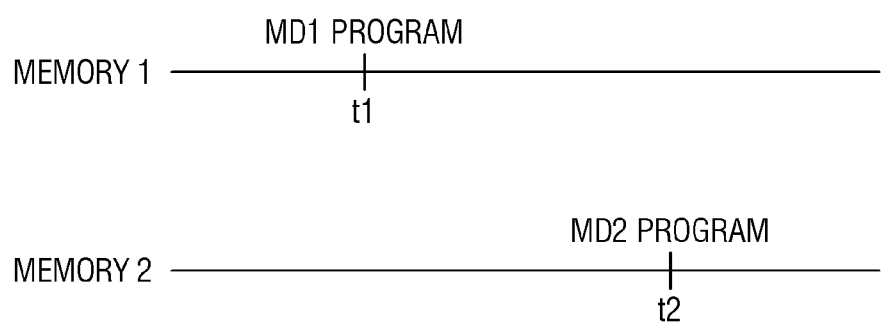
FIG. 10 is a time diagram illustrating a program operation of an example embodiment of a solid state drive.

FIG. 10 is a timing diagram illustrating the program operation of an example embodiment of a solid state drive.

Referring to FIGS. 3 and 10, the method for programming solid state drive 20 according to some embodiments may be different from the reading method.

Memory controller 500 receives a metadata program request from the host (10 of FIG. 1). When memory controller 500 receives the metadata program request, condition checker 520 checks the conditions of first memory 610 and second memory 620.

Condition checker 520 may select a memory having a better condition among first memory 610 and second memory 620, similarly to the above-described manner. As a result, memory controller 500 may first program the metadata in the memory selected by condition checker 520.

Assuming that condition checker 520 has selected first memory 610, memory controller 500 may program the first metadata MD1 in first memory 610 at the first time t1.

As soon as the first metadata MD1 is programmed, memory controller 500 may not directly program the second metadata MD2 in second memory 620 which is not selected by condition checker 520.

Condition checker 520 dynamically checks the condition of second memory 620 which is not selected by condition checker 520, and may program the second metadata MD2 in second memory 620 at the second time t2 when the condition becomes better than the first time t1e. The second time t2 may be the time after the first time t1.

Here, the time at which the condition becomes better may mean the time at which a condition score derived by referring to characteristic table 530 through condition checker 520 is greater than or equal to a preset specific numerical value or threshold.

Although the times are different, the first metadata MD1 and the second metadata MD2 may be data of the same contents mirrored to each other. This may be for the purpose of storing the metadata in duplicate so that the metadata can be read from the memory having a better condition at the time of metadata reading later.

Hereinafter, an embodiment of a solid state drive will be described with reference to FIG. 11. The repeated parts of the above explanation will be omitted or simplified.

Figure 11:
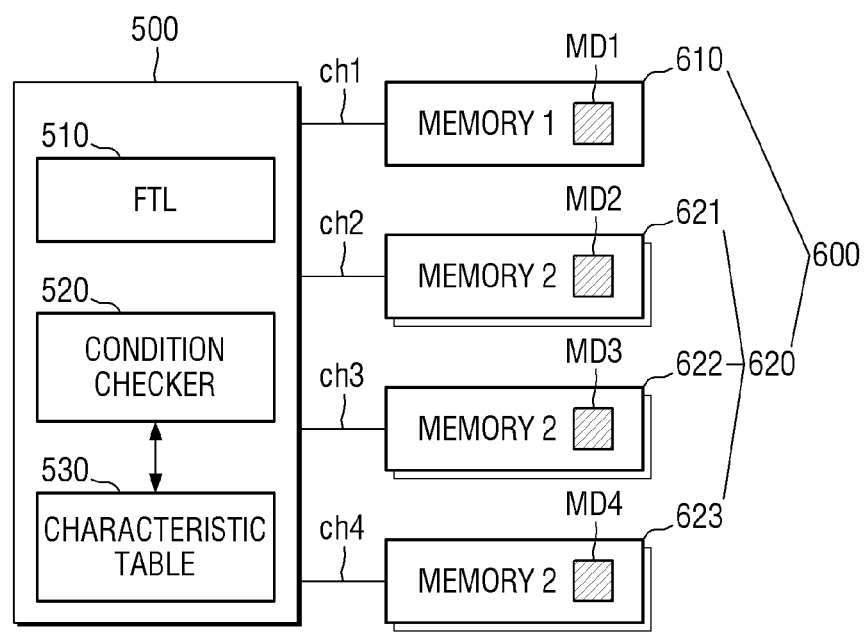
FIG. 11 is a block diagram illustrating an example embodiment of a solid state drive.

FIG. 11 is a block diagram illustrating an example embodiment of a solid state drive.

In the solid state drive of FIG. 11, the mirrored metadata may exist not only in first channel memory 621 but also in each of second channel memory 622 and third channel memory 623.

Specifically, the third metadata MD3 is stored in second channel memory 622 connected to the third channel Ch3, and the fourth metadata MD4 may be stored in third channel memory 623 connected to the fourth channel Ch4.

As a result, condition checker 520 may compare first memory 610, first channel memory 621, second channel memory 622, and third channel memory 623 together to select any one of them, rather than simply comparing the condition scores of first memory 610 and second memory 620.

Here, the first metadata MD1, the second metadata MD2, the third metadata MD3, and the fourth metadata MD4 are all metadata mirrors having the same contents.

In embodiments of solid state drive 20, the status values such as the temperature, the PE cycle, the program retention time, and the erase retention time may be different even in the same kind or type of memory of different channels. Therefore, it is possible to select the memory of the best condition among the same kind or type of memories and read the metadata therefrom.

Accordingly, since the metadata is read without being corrupted, the overall operation performance of solid state drive 20 may be greatly improved.

Hereinafter, another example embodiment of a solid state drive will be described with reference to FIG. 12. The repeated parts of the above explanation will be omitted or simplified.

Figure 12:
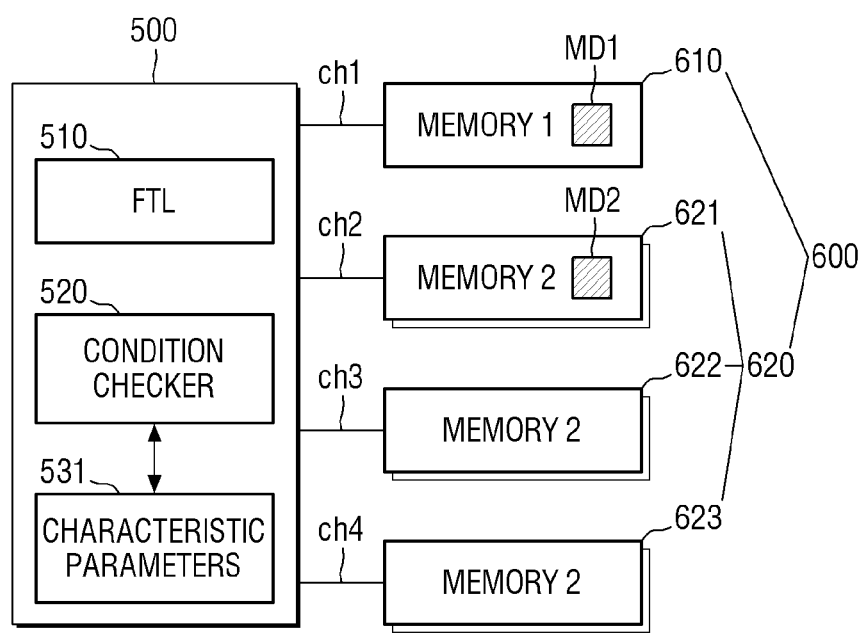
FIG. 12 is a block diagram illustrating another example embodiment of a solid state drive.

FIG. 12 is a block diagram illustrating another example embodiment of a solid state drive.

Referring to FIG. 12, a memory controller 500 of the solid state drive may include characteristic parameters 531.

Characteristic parameters 531 may include a characteristic parameter of first memory 610 and a characteristic parameter of second memory 620. Characteristic parameters 531 may be parameters multiplied by the status value.

For example, the condition checker may use a formula such as $y=a_1X_1+a_2X_2+a_3X_3$. Here, y is a condition score, and $X_1$, $X_2$ and $X_3$ may be a status value of temperature, a status value of the P/E cycle and a status value of program retention time, respectively. Also, $a_1$, $a_2$ and $a_3$ may be the parameters of $X_1$, $X_2$ and $X_3$ respectively and may be stored in characteristic parameter 531.

The above parameters are stored for each memory and may be used for condition checker 520 to derive the condition score of each memory.

At this time, the formula may be a polynomial having a higher order, rather than a linear expression as described above. This may be appropriately changed or varied in consideration of the characteristics of the memory. For example, a first order term may be used for a particular status value, but a second order term can be used for another status value.

Hereinafter, yet another example embodiment of a solid state drive will be described with reference to FIG. 13. The repeated parts of the above explanation will be omitted or simplified.

Figure 13:
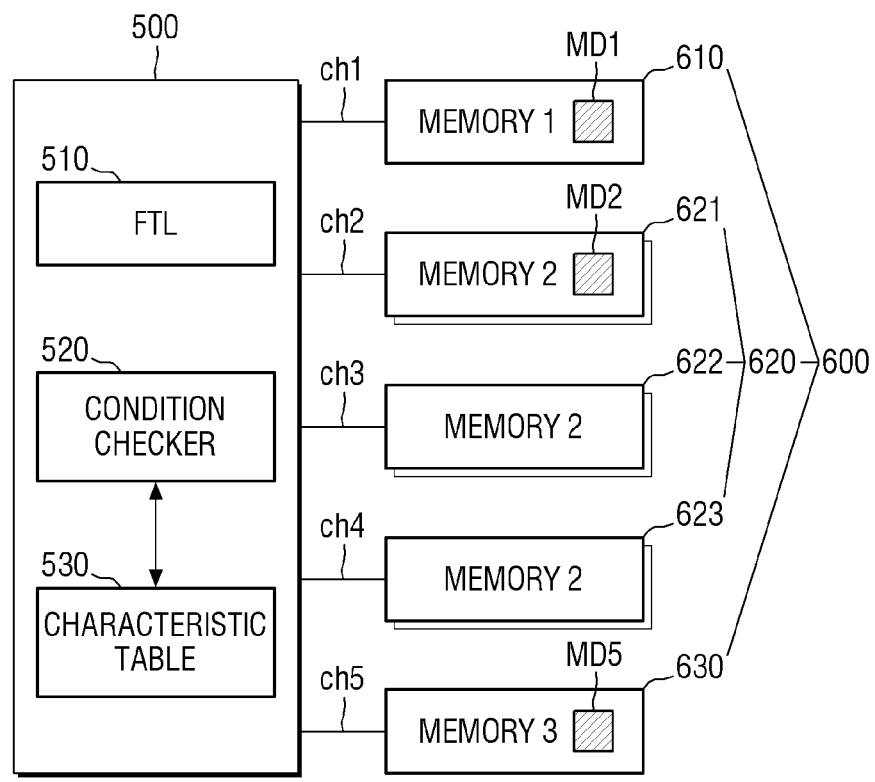
FIG. 13 is a block diagram illustrating yet another example embodiment of a solid state drive.

FIG. 13 is a block diagram illustrating yet another example embodiment of a solid state drive.

Referring to FIG. 13, the solid state drive may further include a third memory 630.

Third memory 630 may be a memory of a different kind or type than first memory 610 and second memory 620. For example, if first memory 610 is a PRAM and second memory 620 is a NAND flash memory, third memory 630 may be a RRAM.

Third memory 630 may be connected to memory controller 500 via the fifth channel Ch5. Third memory 630 may include fifth metadata MD5 in which the first metadata MD1 and the second metadata MD2 are mirrored. That is, the fifth metadata MD5 may be metadata having the same contents as the first metadata MD1 and the second metadata MD2.

Condition checker 520 may derive the condition scores of first memory 610, second memory 620 and third memory 630, respectively.

Condition checker 520 may refer to characteristic table 530. Characteristic table 530 may separately include characteristic tables of first memory 610, second memory 620 and third memory 630.

Condition checker 520 may compare the respective condition scores of first memory 610, second memory 620 and third memory 630 and select the memory having the best condition.

As a result, memory controller 500 may read the metadata of the memory selected by condition checker 520.

The solid state drive according to the present embodiment may compare each of the conditions of three different kinds or types of memories and read metadata of the best memory. Therefore, it is possible to provide a more stable and reliable solid state drive.

Three kinds or types of memories are illustrated in FIG. 13, but embodiments are not limited thereto. That is, the solid state drive according to some embodiments may include four or more kinds or types of memories, may determine the respective conditions thereof, and may select the memory having the best condition.

Hereinafter, a solid state drive according to some embodiments will be described with reference to FIGS. 1, 13, and 14. The repeated parts of the above explanation will be omitted or simplified.

Figure 14:
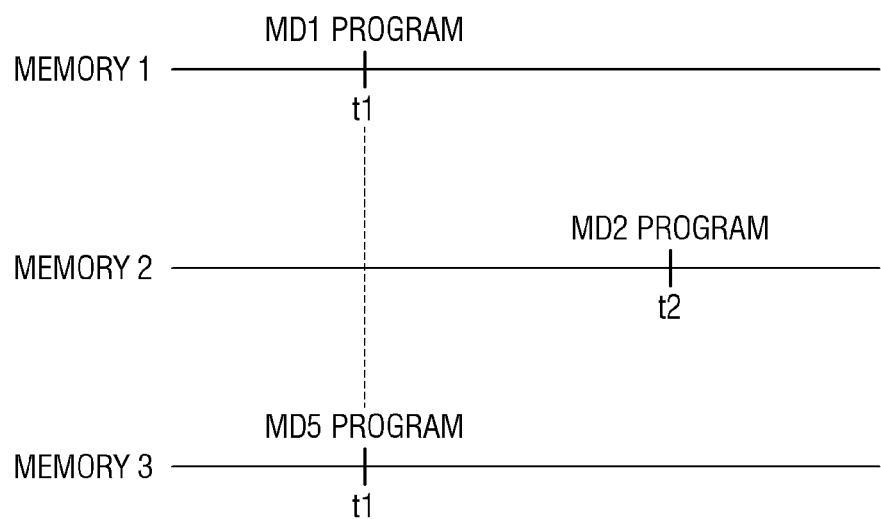
FIG. 14 is a time diagram illustrating an example embodiment of a program operation of a solid state drive.

FIG. 14 is a time diagram illustrating an example embodiment of a program operation of a solid state drive.

Referring to FIGS. 1, 13, and 14, the method for programming the solid state drive according to some embodiments may first program all of the memories other than the memory having the worst condition.

Memory controller 500 receives a metadata program request from host 10, and condition checker 520 checks the conditions of first memory 610, second memory 620 and third memory 630.

Similarly to the above-described manner, condition checker 520 may select a memory having a better condition among first memory 610, second memory 620, and third memory 630. However, condition checker 520 may select multiple memories rather than just one memory.

Specifically, condition checker 520 may select the remaining memories, that is, the two memories other than the memory having the worst condition among a total of the three memories. As a result, memory controller 500 may first program the metadata in the memories selected by condition checker 520.

Assuming that condition checker 520 selects first memory 610 and third memory 630, memory controller 500 may program the first metadata MD1 in first memory 610 at a first time t1, and may program the fifth metadata MD5 in third memory 630 at the same first time t1.

Memory controller 500 may not directly program the second metadata MD2 in second memory 620 which is not selected by condition checker 520 as soon as the first metadata MD1 and the fifth metadata MD5 are programmed.

Condition checker 520 dynamically checks the condition of second memory 620 which is not selected by condition checker 520, and may program the second metadata MD2 in second memory 620 at the second time t2 when the condition of second memory 620 is better than at the first time t1. The second time t2 may be a time after the first time t1.

Here, the time when the condition of second memory 620 is better may mean a time when a condition score derived by referring to characteristic table 530 through condition checker 520 is greater than or equal to a preset specific numerical value or threshold.

Although the programming times are different, the first metadata MD1, the fifth metadata MD5 and the second metadata MD2 may be data having the same contents mirrored to each other. This may be for the purpose of storing the metadata in duplicate so that the metadata can be read later from the memory having the better condition.

In this embodiment, the metadata is not immediately programmed in a memory of a poor condition, and by causing the metadata to be programmed when the condition becomes better later, it is possible to prevent corruption of the metadata.

Hereinafter, a solid state drive according to some embodiments will be described with reference to FIGS. 1, 13, and 15. The repeated parts of the above explanation will be omitted or simplified.

Figure 15:
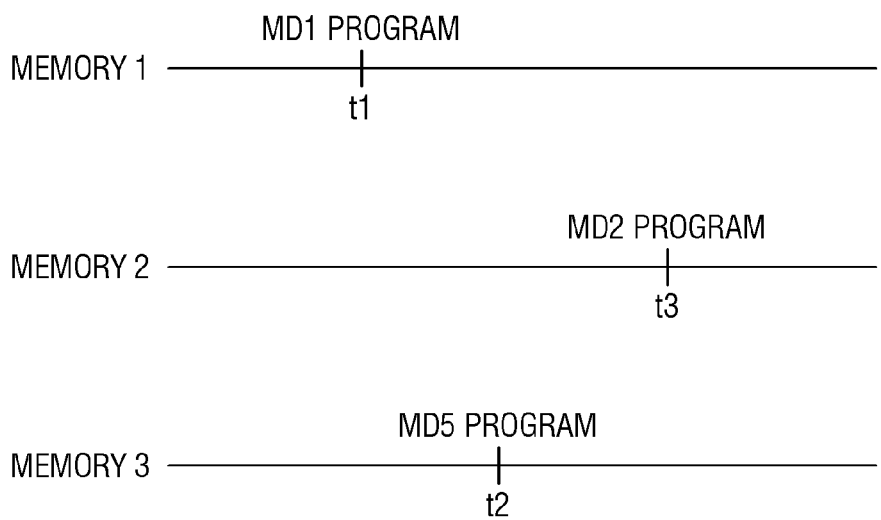
FIG. 15 is a time diagram illustrating another example embodiment of a program operation of a solid state drive.

FIG. 15 is a time diagram illustrating another example embodiment of a program operation of a solid state drive.

Referring to FIGS. 1, 13, and 15, the method for programming the solid state drive according to some embodiments may first program the memory having the best condition, and thereafter may sequentially program the remaining memories.

Condition checker 520 may select a memory having the best condition among first memory 610, second memory 620 and third memory 630 similarly to the above-mentioned method.

Specifically, condition checker 520 may select a memory having the best condition among a total of three memories. As a result, memory controller 500 may first program the metadata in the memory selected by condition checker 520.

Assuming that condition checker 520 has selected first memory 610, memory controller 500 may program the first metadata MD1 in first memory 610 at the first time t1.

Memory controller 500 may not directly program each of the second metadata MD2 and the fifth metadata MD5 in second memory 620 and third memory 630, respectively, which are not selected by condition checker 520 as soon as the first metadata MD1 is programmed.

Condition checker 520 may dynamically check the conditions of second memory 620 and third memory 630 which are not selected by condition checker 520. Subsequently, the fifth metadata MD5 may be programmed in third memory 630 at the second time t2 when the condition of third memory 630 becomes better than that of the first time t1. The second time t2 may be a time after the first time t1.

Likewise, condition checker 520 may further check the condition of second memory 620 which is not dynamically programmed Subsequently, the second metadata MD2 may be programmed in second memory 620 at the third time t3 at which the condition of second memory 60 becomes better than at the first time t1 and the second time t2. The third time t3 may be a time after the first time t1 and the second time t2.

At this time, the time at which the condition becomes better may mean the time at which the condition score derived by referring to characteristic table 530 through condition checker 520 is greater than or equal to a preset specific numerical value or threshold.

Although the times are different, the first metadata MD1, the fifth metadata MD5 and the second metadata MD2 may be data having the same contents mirrored to each other.

In this embodiment, by causing each memory to program the metadata at the time when the condition is good, it is possible to more easily prevent corruption of the metadata. In other words, since each memory is programmed at the time when the condition is good, the reliability of all metadata may be very high.

Hereinafter, the solid state drive according to some embodiments will be described with reference to FIGS. 1, 13, and 16. The repeated parts of the above explanation will be omitted or simplified.

Figure 16:
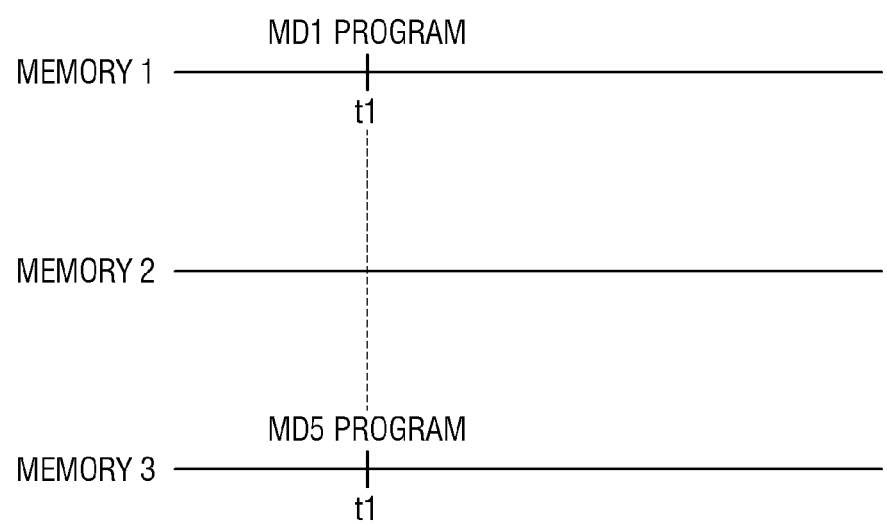
FIG. 16 is a time diagram illustrating yet another example embodiment of a program operation of a solid state drive.

FIG. 16 is a time diagram illustrating yet another embodiment of a program operation of a solid state drive.

Referring to FIGS. 1, 13, and 16, the method for programming the solid state drive according to some embodiments of the present invention may program metadata, except for memory of the worst condition.

In the same way as the above-described method, condition checker 520 may select the remaining memories other than the memory having the worst condition among first memory 610, second memory 620, and third memory 630.

Specifically, condition checker 520 may select two memories except the memory having the worst condition among a total of three memories. As a result, memory controller 500 may first program the metadata in the memory selected by condition checker 520.

Assuming that condition checker 520 has selected first memory 610 and third memory 630, memory controller 500 may program the first metadata MD1 in first memory 610 at the first time t1, and may program the fifth metadata MD5 in third memory 630 at the second time t2.

Memory controller 500 may not program the metadata in second memory 620 which is not selected by condition checker 520. Of course, the first metadata MD1 and the fifth metadata MD5 may be data having the same contents mirrored to each other.

In the present embodiment, even if only one among a plurality of memories is excluded, since the metadata is stored in duplicate, under the premise that the reliability of the metadata may be sufficiently improved, it is possible to exclude the operation of intentionally executing the program on the memory which has the worst condition.

An operation of continuously and dynamically checking the condition of second memory 620 which is not selected from condition checker 520 after the first time t1, and an operation of dynamically checking the metadata in second memory 620 consume a lot of resource. Thus, in this embodiment, it is possible to maintain the operating performance of the solid state drive at a high level by excluding the above operations and conserving the resources which would be expended in such operations. At the same time, since the solid state drive of this embodiment programs the two metadata in each of the two memories, the reliability of the metadata may also be maintained at a high level.

Hereinafter, a metadata access method of the solid state drive according to some embodiments will be described with reference to FIGS. 1, 3, and 17. The repeated parts of the above explanation will be omitted or simplified.

Figure 17:
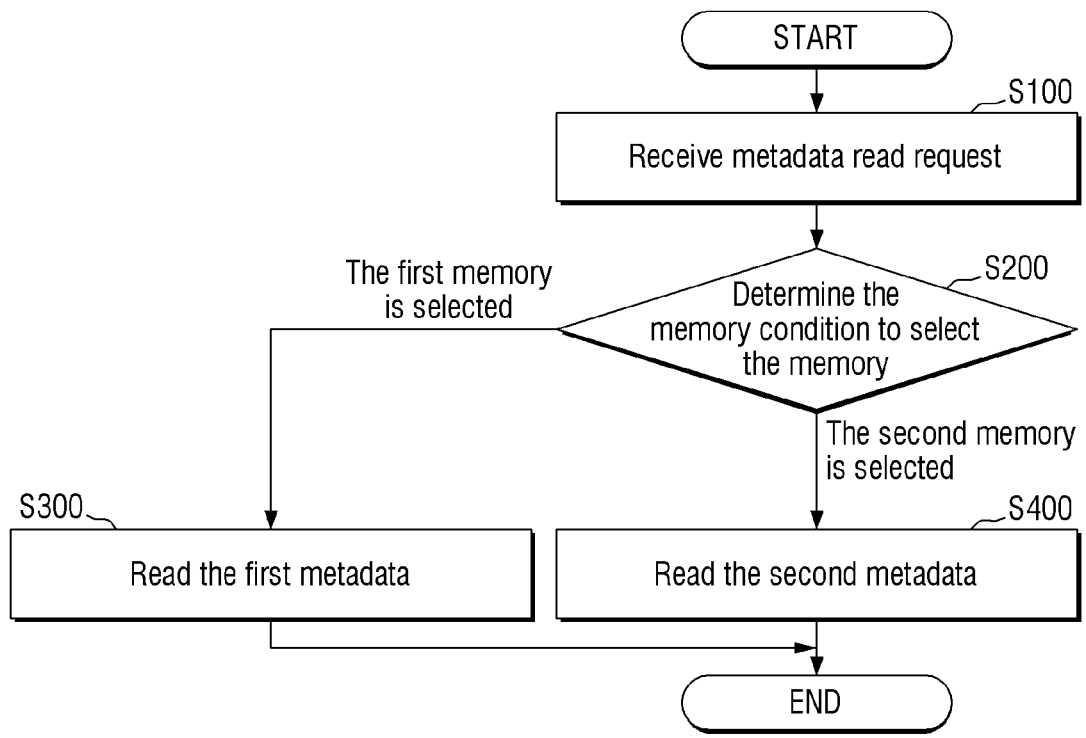
FIG. 17 is a flowchart illustrating an example embodiment of a metadata access method of a solid state drive.

FIG. 17 is a flowchart illustrating an example embodiment of a metadata access method of a solid state drive.

Referring to FIG. 17, in an operation S100, a metadata read request is received.

Specifically, referring to FIG. 1 and FIG. 3, when there are read requests of the metadata from host 10, memory controller 500 may receive the read requests.

Referring again to FIG. 17, in an operation S200 the memory conditions of the different memories are determined and a memory is selected.

Specifically, referring to FIGS. 1 and 3, condition checker 520 may determine the current condition of first memory 610 and may determine the current condition of second memory 620. Condition checker 520 may compare the condition of first memory 610 with the condition of second memory 620 and select the memory having a better condition. For example, condition checker 520 may determine conditions of first memory 610 and second memory 620 with reference to characteristic table 530.

Referring again to FIG. 17, when the first memory is selected, then in an operation S300 the first metadata is read.

Specifically, referring to FIGS. 1 and 3, since first memory 610 has a better condition than second memory 620, the first metadata MD1 in first memory 610 may have higher reliability than the second metadata MD2 in second memory 620.

Referring again to FIG. 17, if the second memory is selected, then in an operation S400 the second metadata is read (S400).

Specifically, referring to FIGS. 1 and 3, since second memory 620 is in a better condition, the second metadata MD2 may have higher reliability.

The metadata access method of the solid state drive according to some embodiments stores the metadata mirrored to the different kinds or types of memories, and reads the metadata from a memory having a better condition. Thus, it is possible to improve the reliability of the solid state drive.

Hereinafter, the metadata access method of the solid state drive according to some embodiments will be described referring to FIGS. 1, 3, 10, and 18. The repeated parts of the above explanation will be omitted or simplified.

Figure 18:
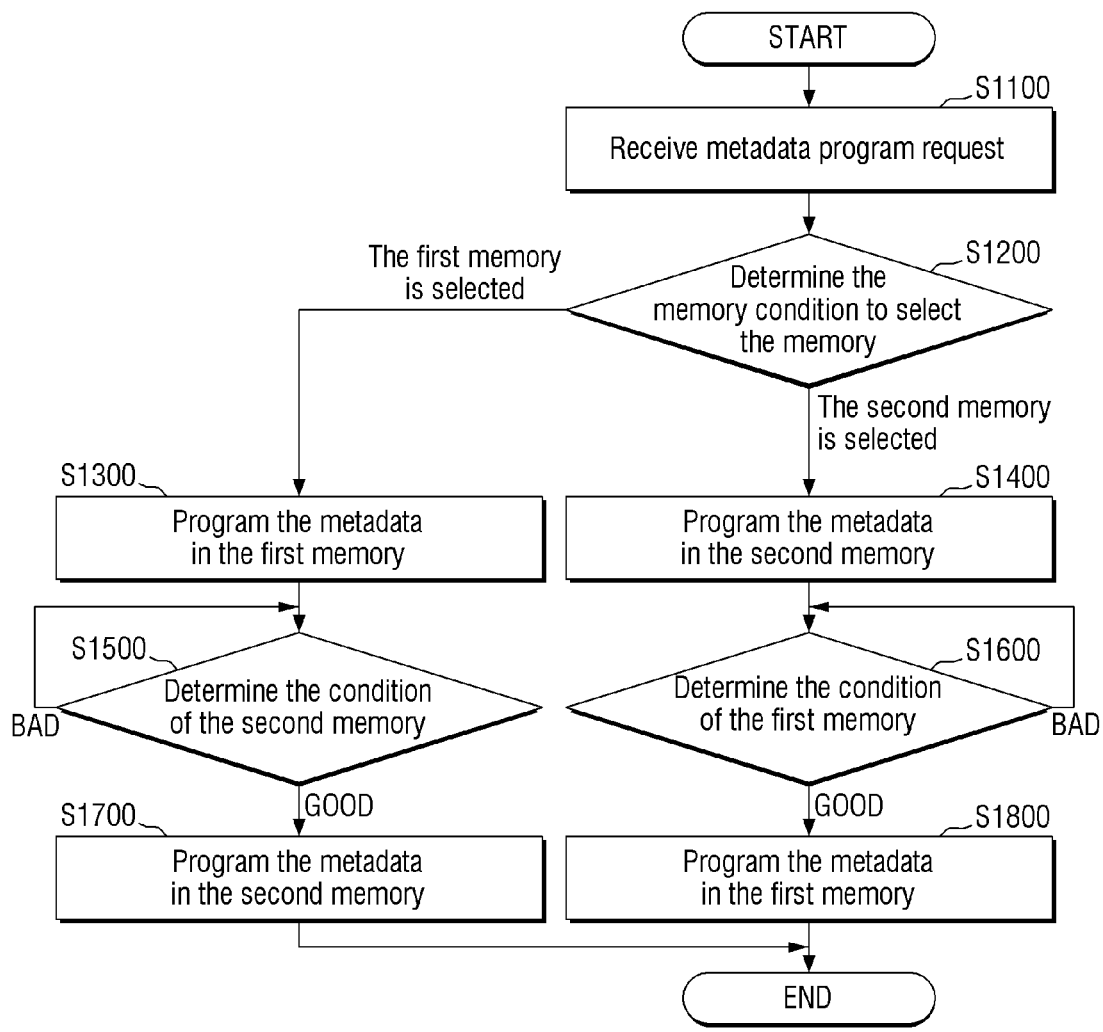
FIG. 18 is a flowchart illustrating another example embodiment of a metadata access method of a solid state drive.

FIG. 18 is a flowchart illustrating another example embodiment of a metadata access method of a solid state drive.

Referring to FIG. 18, in an operation S1100 a metadata program request is received.

Specifically, referring to FIGS. 1, 3, and 10, when there are program requests of the metadata from host 10, memory controller 500 may receive the program requests.

Referring again to FIG. 18, the memory conditions of the various memories of the SSD are determined and a memory is selected (S1200).

Specifically, referring to FIGS. 1, 3 and 10, when memory controller 500 receives the metadata program request, condition checker 520 checks the conditions of first memory 610 and second memory 620. Condition checker 520 may select a memory having a better condition among first memory 610 and second memory 620 similarly to the above-described method.

Referring again to FIG. 18, when the first memory is selected, then in an operation S1300 the metadata is programmed in the first memory.

Specifically, referring to FIGS. 1, 3 and 10, since first memory 610 has a better condition than that of second memory 620, in order to prevent the possibility of corruption of the metadata, the metadata may be programmed only in first memory 610. At this time, when the metadata is programmed in first memory 610, programming metadata into the memory having a bad condition may be corrupted.

Referring again to FIG. 18, in an operation S1500, the condition of the second memory is determined.

Specifically, referring to FIGS. 1, 3 and 10, since the metadata has already been programmed in first memory 610, condition checker 520 may dynamically check the condition on second memory 620 in which the metadata is not programmed.

If the condition of second memory 620 is not good, it is possible to wait until the condition of second memory 620 becomes better, without programming the metadata.

Referring again to FIG. 18, if the condition of the second memory becomes better, then in an operation S1700 the metadata is programmed in the second memory.

That is, condition checker 520 dynamically checks the condition of second memory 620 which is not selected by condition checker 520, and may program the second metadata MD2 in second memory 620 at the second time t2 when the condition becomes better than the first time t1. The second time t2 may be a time after the first time t1.

At this time, the time at which the condition becomes better may mean a time at which the condition score derived by referring to characteristic table 530 through condition checker 520 is greater than or equal to a preset specific numerical value or threshold.

Referring again to FIG. 18, if second memory 620 is selected, then in operation S1400 the metadata is programmed in second memory 620, in operation S1600 the condition of non-selected first memory 610 is determined, and in operation S1800 the metadata is programmed in first memory 610 at a time when the condition of first memory 610 becomes better.

In the above description, the metadata may be mirrored data in each memory, that is, data including the same contents. As a result, metadata may be read from a memory having a better condition at the time of future metadata read operation.

In the present embodiment, when the condition of a specific memory is not good, the programming of metadata into that memory is not directly executed, and instead the programming of metadata into that memory is executed at the time when the condition of the above-mentioned memory becomes better. Thus, it is possible to prevent corruption of the mirrored metadata.

In the embodiment described above, only two kinds or types of memories are illustrated, but this is merely an example, and the metadata access method of the solid state drive according to the present embodiment may also be applied to a solid state drive including three or more kinds or types of memories. In this case, in step S1200, it is possible to select at least one memory instead of selecting only one memory.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A solid state drive, comprising:
   first and second memories of different types than each other; and
   a memory controller which is configured to control the first and second memories,
   wherein the memory controller includes firmware of the solid state drive and is configured to receive a metadata access request from a host for accessing metadata stored in at least one of the first and second memories,
   wherein the metadata includes at least one of: security metadata for secure authentication of access to the solid state drive, metadata for initial driving of the firmware of the solid state drive, and metadata for debugging the firmware of the solid state drive,
   wherein the memory controller includes a condition checker which is configured to determine conditions of the first and second memories in response to the metadata access request and to select at least one of the first and second memories based on at least one of the conditions, and wherein the memory controller is configured to access a selected at least one of the first and second memories which is selected by the condition checker.

2. The solid state drive of claim 1, wherein the condition checker is configured to determine conditions of the first and second memories in consideration of at least one of a temperature, a number of program/erase (P/E) cycles, a program retention time and an erase retention time.

3. The solid state drive of claim 1, wherein each of the first and second memories is one of a NAND flash memory, a PRAM, an RRAM and a MRAM.

4. The solid state drive of claim 1, wherein the metadata access request is a metadata read request,
wherein each of the first and second memories stores a same metadata as each other,
wherein the condition checker is configured to select one of the first and second memories in response to metadata read request, and
wherein the memory controller is configured to read the metadata in the memory selected by the condition checker among the first and second memories.

5. The solid state drive of claim 1, wherein the metadata access request is a metadata program request, and
the memory controller programs metadata in the memory among the first and second memories selected by the condition checker.

6. The solid state drive of claim 5, wherein the memory controller is configured to first program the metadata in the memory selected by the condition checker among the first and second memories, and
wherein the metadata is programmed in a memory which is not selected by the condition checker when the condition of the memory which is not selected by the condition checker among the first and second memories becomes better.

7. The solid state drive of claim 1, wherein the second memory includes first and second channel memories connected to the memory controller via different channels.

8. The solid state drive of claim 7, wherein the condition checker is configured to determine the conditions of each of the first memory, the first channel memory and the second channel memory in response to the metadata access request, and to select one of the first memory, the first channel memory and the second channel memory.

9. The solid state drive of claim 1, further comprising:
a third memory of a different type than the first and second memories,
wherein the condition checker is configured to select at least one of the first and second memories and third memory in response to the metadata access request, and
the memory controller is configured to access the memory selected by the condition checker.

10. The solid state drive of claim 9, wherein the metadata access request is a metadata program request,
the condition checker is configured to select remaining memories other than the selected at least one of the first and second memories and third memory, and
the memory controller is configured to program the metadata in the memory selected by the condition checker.

11. The solid state drive of claim 10, wherein the memory controller is configured to first program the metadata in the memory selected by the condition checker among the first and second memories and third memory, and when the condition of a memory which is not selected by the condition checker among the first and second memories and third memory becomes better, the memory controller programs the metadata in the memory which is not selected by the condition checker.

12. A solid state drive, comprising:
a memory controller, wherein the memory controller includes firmware of the solid state drive,
a first memory which is configured to store first metadata, wherein the first metadata includes at least one of: security data for secure authentication of access to the solid state drive, data for initial driving of the firmware of the solid state drive, and data for debugging the firmware of the solid state drive; and
a second memory which is configured to store second metadata identical to the first metadata, wherein the second memory is of a different type than the first memory; and
wherein the memory controller is configured to control the first memory and the second memory, and includes a condition checker configured to determine conditions of the first memory and the second memory and to select a one of the first memory and the second memory which has a better condition,
wherein the memory controller is configured to receive a metadata read request from a host, and to read one of the first metadata and the second metadata stored in the memory selected by the condition checker in response to the metadata read request.

13. The solid state drive of claim 12, wherein the condition checker is configured to receive current status information of the first memory and the second memory, to determine conditions of the first memory and the second memory based on the current status information, and
wherein the current status information includes at least one of a temperature, a number of program/erase (P/E) cycles, a program retention time and an erase retention time of the first memory and the second memory.

14. The solid state drive of claim 13, wherein the condition checker includes a characteristic table which is configured to store characteristic values corresponding to current status information for each of the first memory and the second memory.

15. The solid state drive of claim 13, wherein the condition checker includes characteristic parameters corresponding to the current status information for each of the first memory and the second memory.

16. The solid state drive of claim 12, wherein the second memory includes first and second channel memories connected to the memory controller via different channels, and
wherein the condition checker is configured to determine the conditions of each of the first memory, the first channel memory and the second channel memory in response to the metadata read request, and to select one of the first memory, the first channel memory and the second channel memory.

17. A method, comprising:
a solid state drive (SSD) receiving a metadata read request from a host for accessing metadata stored in the SSD, wherein the SSD includes at least first and second memories of different types than each other, wherein the SSD includes firmware, and wherein the metadata includes at least one of: data for secure authentication of access to the SSD, data for initial driving of the firmware of the SSD, and data for debugging the firmware of the SSD;
determining conditions of the first and second memories to select one of the first and second memories; and reading the metadata from a selected memory among the first and second memories.

18. The method of claim 17, further comprising:

receiving a metadata program request from the host;

determining the conditions of each of the first and second memories to select at least one of the first and second memories; and programming the metadata in a selected memory among the first and second memories.

19. The method of claim 18, further comprising:

after programming the metadata in the selected memory among the first and second memories, when the condition of a non-selected memory among the first and second memories becomes better, programming the metadata in the non-selected memory among the first and second memories.

20. The method of claim 18, wherein the second memory includes first and second channel memories having different channels, and wherein determination of the conditions of the first and second memories and selection of one of them includes:

determining the conditions of each of the first memory and the first and second channel memories and selecting one of the first memory and the first and second channel memories and selecting one.

* * * * *